United States Patent
Hosaka et al.

(10) Patent No.: US 10,113,014 B1
(45) Date of Patent: Oct. 30, 2018

(54) METHOD FOR PRODUCING SOLID CATALYST COMPONENT CONTAINING VANADIUM COMPOUND FOR OLEFIN POLYMERIZATION, OLEFIN POLYMERIZATION CATALYST, AND METHOD FOR PRODUCING OLEFIN POLYMER

(71) Applicant: TOHO TITANIUM CO., LTD., Chigasaki-shi, Kanagawa (JP)

(72) Inventors: Motoki Hosaka, Chigasaki (JP); Toshihiko Sugano, Chigasaki (JP); Tsutomu Uzawa, Chigasaki (JP)

(73) Assignee: TOHO TITANIUM CO., LTD., Chigasaki-shi (JP)

( * ) Notice: Subject to any disclaimer, the term of this patent is extended or adjusted under 35 U.S.C. 154(b) by 0 days.

(21) Appl. No.: 15/634,338

(22) Filed: Jun. 27, 2017

(51) Int. Cl.
*C08F 4/685* (2006.01)
*C08F 10/00* (2006.01)
*C08K 5/10* (2006.01)
*C08F 4/14* (2006.01)

(52) U.S. Cl.
CPC ............... *C08F 4/685* (2013.01); *C08F 4/14* (2013.01); *C08F 10/00* (2013.01); *C08K 5/10* (2013.01)

(58) Field of Classification Search
None
See application file for complete search history.

(56) References Cited

U.S. PATENT DOCUMENTS

| | | | |
|---|---|---|---|
| 4,663,299 A | 5/1987 | Chadwick et al. | |
| 4,728,704 A | 3/1988 | Chadwick et al. | |
| 5,422,400 A | 6/1995 | Kamiyama et al. | |
| 6,054,542 A | 4/2000 | Kojoh et al. | |
| 2003/0050184 A1* | 3/2003 | Job ........................ | B01J 21/10 502/150 |

FOREIGN PATENT DOCUMENTS

| | | |
|---|---|---|
| EP | 0 602 508 B1 | 11/1998 |
| JP | 58-41832 A | 3/1983 |
| JP | 62-51633 A | 3/1987 |
| JP | 3-74341 A | 3/1991 |
| JP | 4-368391 A | 12/1992 |
| JP | 8-73388 A | 3/1996 |

\* cited by examiner

*Primary Examiner* — Catherine S Branch
(74) *Attorney, Agent, or Firm* — Westerman, Hattori, Daniels & Adrian, LLP

(57) ABSTRACT

A solid catalyst component for olefin polymerization, an olefin polymerization catalyst, and a method for producing an olefin polymer, are disclosed. A solid catalyst component for olefin polymerization includes magnesium, a halogen, titanium, vanadium, and an internal electron donor compound selected by organic acid diester. An olefin polymerization catalyst includes the disclosed solid catalyst component for olefin polymerization, an organoaluminum promoter, and an optional external electron donor A method for producing an olefin copolymer includes copolymerizing ethylene and propylene using the disclosed olefin polymerization catalyst.

2 Claims, No Drawings

METHOD FOR PRODUCING SOLID CATALYST COMPONENT CONTAINING VANADIUM COMPOUND FOR OLEFIN POLYMERIZATION, OLEFIN POLYMERIZATION CATALYST, AND METHOD FOR PRODUCING OLEFIN POLYMER

TECHNICAL FIELD

The present invention relates to a solid catalyst component for olefin polymerization, an olefin polymerization catalyst, and a method for producing an olefin polymer.

BACKGROUND ART

A solid catalyst component that includes magnesium, titanium, internal electron donor, a halogen as essential components has been used when polymerizing an olefin (e.g., propylene). A number of methods that polymerize an olefin or copolymerize olefins in the presence of an olefin polymerization catalyst that includes the solid catalyst component, an organoaluminum compound, and an organosilicon compound, have been proposed.

On the other hand, a solid catalyst component that includes magnesium, titanium, vanadium, a halogen as essential components has been used when copolymerizing olefins (e.g., ethylene and propylene). A number of methods that polymerize an olefin or copolymerize olefins in the presence of an olefin polymerization catalyst that includes the solid catalyst component and an organoaluminum compound have been proposed.

Catalyst systems that include titanium compounds and vanadium compounds have been proposed to produce excellent copolymer, especially for random copolymer components from ethylene and propylene. The prior arts are as follows;

U.S. Pat. No. 6,054,542 Mitsui Petrochemical
EP0602508B1 Hostalen Polyethylene GmbH
U.S. Pat. No. 5,422,400 Maruzen Polymer Company, Ltd.

Technical Problem

The olefin polymerization catalysts shown in the prior arts above do not contain internal donor compound such as phthalate. When these catalysts are used for propylene homopolymerization, the activity is low and isotacticity of obtained polypropylene is poor because the catalysts shown in the prior arts do not contain internal electron donor. Furthermore, propylene-based block copolymer with a good balance between rigidity and impact resistance can't be produced because of the low productivity of highly-isotactic polypropylene.

Solution to Problem

The inventors of the invention conducted extensive studies in view of the above situation. As a result, the inventors found that the above object can be achieved by effecting copolymerization using a copolymerization catalyst that includes a solid catalyst component that includes magnesium, titanium, vanadium, a halogen, and a organic acid diester compound as an internal electron donor. This finding has led to the completion of the invention.

Specifically, one aspect of the invention provides a method for producing a propylene-based block copolymer including copolymerizing propylene and alpha-olefin in the presence of a copolymerization compound that includes:

Preferably, a solid catalyst component for olefin polymerization comprising magnesium, a halogen, titanium, vanadium, and an internal electron donor compound selected by organic acid diester represented by the following general formula (1), $$R^1{}_k(C_6H_{4-k})(COOR^2)(COOR^3) \qquad (1)$$

wherein $R^1$ is a halogen atom or an alkyl group having 1 to 20 carbon atoms, $R^2$ and $R^3$ are a linear alkyl group having 1 to 12 carbon atoms, a branched alkyl group having 3 to 6 carbon atoms, a vinyl group, or an alkenyl group, provided that $R^2$ and $R^3$ are either identical or different, and k is an integer from 0 to 4, provided that a plurality of $R^1$ are either identical or different when k is an integer from 2 to 4.

A method for producing a solid catalyst component for olefin polymerization comprising bringing a vanadium compound into contact with a solid component that comprises magnesium, a halogen, titanium, and an internal electron donor compound.

An olefin polymerization catalyst comprising the above mentioned solid catalyst component for olefin polymerization, an organoaluminum promoter, and an optional external electron donor.

A method for producing an olefin copolymer comprising copolymerizing ethylene and propylene using the above mentioned olefin polymerization catalyst.

Advantageous Effects of the Invention

When the solid catalyst component for olefin polymerization according to the invention is used to produce copolymer, the isotacticity of the copolymer becomes high and the elasticity of the rubber part is increased, and the intrinsic viscosity of the rubber parts is high, and therefore the impact strength of the resulting copolymer is improved as compared with the case of using a known solid catalyst component.

The solid catalyst component for olefin polymerization according to the invention can maintain high ethylene polymerization activity even at a polymerization temperature lower than the polymerization temperature employed when using a known solid catalyst component for olefin polymerization, and reduce the energy cost required for polymerization.

DESCRIPTION OF EMBODIMENTS

Solid Catalyst Component for Copolymerization that Forms Catalyst

A solid catalyst component for olefin polymerization (hereinafter may be referred to as "component (I)" or "solid catalyst component (I)") includes magnesium, a halogen, titanium, vanadium, and an internal electron donor compound selected by organic acid diester.

The internal electron donor compound is preferably one or more internal electron donor compound selected from the following general formula (1) (hereinafter may be referred to as "component (A)" or "compound (A)");

$$R^1{}_k(C_6H_{4-k})(COOR^2)(COOR^3) \qquad (1)$$

wherein $R^1$ is a halogen atom or an alkyl group having 1 to 20 carbon atoms, $R^2$ and $R^3$ are a linear alkyl group having 1 to 12 carbon atoms, a branched alkyl group having 3 to 12 carbon atoms, a vinyl group, or an alkenyl group having 3 to 12 carbon atoms, provided that $R^2$ and $R^3$ are either identical or different, and k is an integer from 0 to 4, provided that a plurality of $R^1$ are either identical or different when k is an integer from 2 to 4.

Examples of the halogen in the general formula (1) include fluorine, chlorine, bromine, and iodine. Among these, chlorine, bromine, and iodine are preferable, and chlorine and iodine are particularly preferable.

Examples of the linear alkyl group having 1 to 20 carbon atoms that may be represented by $R^1$ in the general formula (1) is preferably a linear alkyl group having 1~12 carbon atoms, and more preferably a linear alkyl group having 1~10 carbon atoms.

Examples of the linear alkyl group having 1 to 20 carbon atoms that may be represented by $R^1$ include a methyl group, an ethyl group, a n-propyl group, a n-butyl group, a n-pentyl group, a n-hexyl group, a n-heptyl group, a n-octyl group, a n-nonyl group, a n-decyl group, and the like.

Examples of the branched alkyl group having 3 to 12 carbon atoms that may be represented by $R^2$ or $R^3$ in the general formula (1) is preferably a branched alkyl group having 3~10 carbon atoms, and more preferably a branched alkyl group having 4~8 carbon atoms.

Examples of the branched alkyl group having 3 to 12 carbon atoms that may be represented by $R^2$ or $R^3$ include an alkyl group that includes a secondary carbon atom or a tertiary carbon atom (e.g., isopropyl group, isobutyl group, t-butyl group, isopentyl group, neopentyl group and 2-ethylhexyl).

Examples of an alkenyl group having 3 to 12 carbon atoms that may be represented by $R^2$ or $R^3$ include an allyl group, a 3-butenyl group, a 4-hexenyl group, iso-butenyl group, a 5-hexenyl group, a 7-octenyl group, a 2-ethyl 4-hexenyl group, a 10-dodecenyl group, and the like.

$R^2$ and $R^3$ are either identical or different, and k is an integer from 0 to 4, provided that a plurality of $R^1$ are either identical or different when k is an integer from 2 to 4.

k is 0 to 4, and preferably 0~2.

The solid catalyst component (I) may include a polysiloxane (hereinafter may be referred to as "component (F)"). The stereoregularity or the crystallinity of the resulting polymer can be improved, and production of a fine powder can be reduced by utilizing the polysiloxane. The term "polysiloxane" refers to a polymer that includes a siloxane linkage (—Si—O—) in the main chain, and is also referred to as "silicone oil". The polysiloxane may be a chain-like, partially hydrogenated, cyclic, or modified polysiloxane that is liquid or viscous at room temperature, and has a viscosity at 25° C. of 0.02 to 100 cm2/s (2 to 10,000 cSt), and preferably 0.03 to 5 cm2/s (3 to 500 cSt).

Examples of the chain-like polysiloxane include disiloxanes such as hexamethyldisiloxane, hexaethyldisiloxane, hexapropyldisiloxane, hexaphenyldisiloxane, 1,3-divinyltetramethyldisiloxane, 1,3-dichlorotetramethyldisiloxane, 1,3-dibromotetramethyldisiloxane, chloromethylpentamethyldisiloxane, 1,3-bis(chloromethyl)tetramethyldisiloxane, and for example, polysiloxane except disiloxanes such as dimethylpolysiloxane and methylphenylpolysiloxane. Examples of the partially hydrogenated polysiloxane include methyl hydrogen polysiloxane having a degree of hydrogenation of 10 to 80%. Examples of the cyclic polysiloxane include hexamethylcyclotrisiloxane, octamethylcyclotetrasiloxane, decamethylcyclopentasiloxane, 2,4,6-trimethylcyclotrisiloxane, and 2,4,6,8-tetramethylcyclotetrasiloxane. Examples of the modified polysiloxane include a higher fatty acid group-substituted dimethylsiloxane, an epoxy group-substituted dimethylsiloxane, and a polyoxyalkylene group-substituted dimethylsiloxane. Among these, decamethylcyclopentasiloxane and dimethylpolysiloxane are preferable, and decamethylcyclopentasiloxane is particularly preferable.

The content of titanium, vanadium, magnesium, the halogen (halogen atoms), and the component (A) in the solid catalyst component (I) is not particularly limited.

The content of titanium in the solid catalyst component (I) is preferably 0.1 to 10 mass %, more preferably 0.5 to 8.0 mass %, and most preferably 1.0 to 5.0 mass %.

The content of vanadium in the solid catalyst component (I) is preferably 0.1 to 20 mass %, more preferably 0.1 to 10 mass %, and most preferably 0.2 to 8 mass %.

The molar ratio of vanadium based on titanium (content of vanadium (mol)/content of titanium (mol)) in the solid catalyst component (I) is preferably 0.1 to 20, more preferably 0.2 to 16, and still more preferably 0.5 to 10.

The content of magnesium in the solid catalyst component (I) is preferably 10 to 40 mass %, more preferably 10 to 30 mass %, and most preferably 13 to 25 mass %.

The content of the halogen (halogen atoms) in the solid catalyst component (I) is preferably 20 to 89 mass %, more preferably 30 to 85 mass %, and most preferably 40 to 75 mass %.

The content of the internal electron donor in the solid catalyst component (I) is preferably 0.5 to 40 mass %, more preferably 1 to 30 mass %, and most preferably 2 to 25 mass %.

The solid catalyst component (I) may include a reagent that includes silicon, phosphorus, or a metal (e.g., aluminum) in addition to the above components. Examples of the reagent include an organosilicon compound that includes an Si—O—C linkage, an organosilicon compound that includes an Si—N—C linkage, a phosphoric acid compound that includes a P—O linkage, an organoaluminum compound (e.g., trialkylaluminum, dialkoxyaluminum chloride, alkoxyaluminum dihalide, and trialkoxyaluminum), and an aluminum trihalide. Among these, an organosilicon compound that includes an Si—O—C linkage, an organosilicon compound that includes an Si—N—C linkage, and an organoaluminum compound are preferable. When the solid catalyst component (I) includes such a reagent, the polymerization activity of the resulting solid catalyst component, and the stereoregularity of the resulting polymer can be improved.

These reagents may be used either alone or in combination.

The solid catalyst component (I) that includes the reagent may further include an organosilicon compound represented by the following general formula (2) that includes an unsaturated alkyl group.

$$[CH2=CH—(CH2)_u]_t SiR^4{}_{4-t} \qquad (2)$$

wherein $R^4$ is a hydrogen atom, an alkyl group having 1 to 20 carbon atoms, a cycloalkyl group, a phenyl group, a vinyl group, or a halogen atom, provided that a plurality of $R^4$ are either identical or different when a plurality of $R^4$ are present, u is an integer from 0 to 5, and t is an integer from 1 to 4. In this case, the polymerization activity of the resulting solid catalyst component, and the hydrogen response can be further improved.

The term "unsaturated alkyl group" refers to a vinyl group or an alkenyl group.

Examples of the organosilicon compound include vinyl group-containing alkylsilanes, vinyl group-containing alkoxysilanes, vinyl group-containing cycloalkylsilanes, vinyl group-containing phenylsilanes, vinyl group-containing halogenated silanes, vinyl group-containing halogenated alkylsilanes, alkenyl group-containing vinylsilanes, alkenyl group-containing alkylsilanes, alkenyl group-containing alkoxysilanes, alkenyl group-containing cycloalkylsilanes, alkenyl group-containing phenylsilanes, alkenyl group-containing halogenated silanes, and alkenyl group-containing halogenated alkylsilanes. The vinyl group is represented by $CH_2=CH-$, and the alkenyl group is represented by $CH_2=CH-(CH_2)_u-$.

Among these, vinytrialkylsilanes, allyltrialkylsilanes, divinyldialkylsilanes, diallyldialkylsilanes, trivinylalkylsilanes, and triallylalkylsilanes are preferable, and allyldimethylvinylsilane, diallyldimethylsilane, triallylmethylsilane, di-3-butenydimethylsilane, diallyldichlorosilane, and allyltriethylsilane are particularly preferable. These organosilicon compounds that include an unsaturated alkyl group may be used either alone or in combination.

Method for Producing Solid Catalyst Component (I) for Copolymerization

The solid catalyst component (I) is produced by bringing a vanadium compound into contact with a solid component that comprises magnesium, a halogen, titanium, and an internal electron donor compound.

The magnesium compound may be one or more compounds selected from a magnesium dihalide, a dialkylmagnesium, an alkylmagnesium halide, a dialkoxymagnesium, a diaryloxymagnesium, an alkoxymagnesium halide, a fatty acid magnesium salt, and the like. Among these, a magnesium dihalide, a mixture of a magnesium dihalide and a dialkoxymagnesium, are preferable, and a dialkoxymagnesium is particularly preferable.

Examples of the dialkoxymagnesium include dimethoxymagnesium, diethoxymagnesium, dipropoxymagnesium, dibutoxymagnesium, ethoxymethoxymagnesium, ethoxypropoxymagnesium, butoxyethoxymagnesium, and the like. These dialkoxymagnesiums may be produced by reacting magnesium metal with an alcohol in the presence of a halogen, a halogen-containing metal compound, or the like. These dialkoxymagnesiums may be used either alone or in combination.

It is preferable to use a granular or powdery dialkoxymagnesium when producing the solid catalyst component used in connection with one embodiment of the invention. The dialkoxymagnesium may have an indefinite shape or a spherical shape. For example, when using a spherical dialkoxymagnesium, a polymer powder obtained by polymerization has a better particle shape and a narrow particle size distribution. This improves the handling capability of the polymer powder during polymerization, and eliminates problems such as clogging caused by a fine powder included in the polymer powder.

The spherical dialkoxymagnesium need not necessarily have a perfect spherical shape, but may have an elliptical shape or a potato-like shape. The ratio (1/w) of the major axis diameter 1 to the minor axis diameter w of the spherical dialkoxymagnesium is 3 or less, preferably 1 to 2, and more preferably 1 to 1.5.

The average particle size D50 (i.e., the particle size at 50% in the cumulative volume particle size distribution) of the dialkoxymagnesium measured using a laser diffraction/scattering particle size distribution analyzer is preferably 1 to 200 µm, and more preferably 5 to 150 µm. The average particle size of the spherical dialkoxymagnesium is preferably 1 to 100 µm, more preferably 5 to 50 µm, and still more preferably 10 to 40 µm. It is preferable that the spherical dialkoxymagnesium have a narrow particle size distribution, and have a low fine powder content and a low coarse powder content. More specifically, it is preferable that the spherical dialkoxymagnesium have a content of particles having a particle size (measured using a laser diffraction/scattering particle size distribution analyzer) equal to or less than 5 µm of 20% or less, and more preferably 10% or less. It is preferable that the spherical dialkoxymagnesium have a content of particles having a particle size equal to or more than 100 µm of 10% or less, and more preferably 5% or less.

The particle size distribution ln(D90/D10) (where, D90 is the particle size at 90% in the cumulative volume particle size distribution, and D10 is the particle size at 10% in the cumulative volume particle size distribution) of the spherical dialkoxymagnesium is preferably 3 or less, and more preferably 2 or less. The spherical dialkoxymagnesium may be produced using the method disclosed in JP-A-58-41832, JP-A-62-51633, JP-A-3-74341, JP-A-4-368391, JP-A-8-73388, or the like.

The magnesium compound may be used in the form of a magnesium compound solution, or may be used in the form of a magnesium compound suspension. When the magnesium compound is solid, magnesium compound is dissolved in a solvent that can dissolve the magnesium compound to prepare a magnesium compound solution, or suspended in a solvent that cannot dissolve the magnesium compound to prepare a magnesium compound suspension. When the magnesium compound is liquid, the magnesium compound may be used directly as a magnesium compound solution, or may be dissolved in a solvent that can dissolve the magnesium compound to prepare a magnesium compound solution.

Examples of a compound that can dissolve the solid magnesium compound include at least one compound selected from the group consisting of an alcohol, an ether, and an ester. Specific examples of the compound that can dissolve the solid magnesium compound include an alcohol having 1 to 18 carbon atoms, such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol, isopropylbenzyl alcohol, and ethylene glycol, a halogen-containing alcohol having 1 to 18 carbon atoms, such as trichloromethanol, trichloroethanol, and trichlorohexanol, an ether having 2 to 20 carbon atoms, such as methyl ether, ethyl ether, isopropyl ether, butyl ether, amyl ether, tetrahydrofuran, ethyl benzyl ether, dibutyl ether, anisole, and diphenyl ether, a metal acid ester such as tetraethoxytitanium, tetra-n-propoxytitanium, tetraisopropoxytitanium, tetrabutoxytitanium, tetrahexoxytitanium, tetrabutoxyzirconium, and tetraethoxyzirconium, and the like. Among these, an alcohol (e.g., ethanol, propanol, butanol, and 2-ethylhexanol) is preferable, and 2-ethylhexanol is particularly preferable.

A saturated hydrocarbon solvent or an unsaturated hydrocarbon solvent that does not dissolve a magnesium compound is used as a medium that cannot dissolve the magnesium compound. The saturated hydrocarbon solvent or the unsaturated hydrocarbon solvent is safe and has high industrial versatility. Examples of the saturated hydrocarbon solvent or the unsaturated hydrocarbon solvent include a linear or branched aliphatic hydrocarbon compound having a boiling point of 50 to 200° C., such as hexane, heptane, decane, and methylheptane, an alicyclic hydrocarbon compound having a boiling point of 50 to 200° C., such as cyclohexane, ethylcyclohexane, and decahydronaphthalene, and an aromatic hydrocarbon compound having a boiling point of 50 to 200° C., such as toluene, xylene, and ethylbenzene. Among these, a linear aliphatic hydrocarbon compound having a boiling point of 50 to 200° C. (e.g., hexane, heptane, and decane), and an aromatic hydrocarbon compound having a boiling point of 50 to 200° C. (e.g., toluene, xylene, and ethylbenzene) are preferable. These solvents may be used either individually or in combination.

Examples of the titanium compound include a tetravalent titanium compound represented by the following general formula (3).

$$Ti(OR^5)_j X_{4-j} \quad (3)$$

wherein $R^5$ is a hydrocarbon group having 1 to 10 carbon atoms, provided that a plurality of $R^5$ are either identical or different when a plurality of $OR^5$ are present, X is a halogen group, provided that a plurality of X are either identical or different when a plurality of X are present, and j is an integer from 0 to 4.

The tetravalent titanium compound represented by the general formula (3) is one compound, or two or more compounds, selected from an alkoxytitanium, a titanium halide, and an alkoxytitanium halide. Specific examples of the tetravalent titanium compound include titanium tetrahalides such as titanium tetrafluoride, titanium tetrachloride, titanium tetrabromide, and titanium tetraiodide, alkoxytitanium trihalides such as methoxytitanium trichloride, ethoxytitanium trichloride, propoxytitanium trichloride, and n-butoxytitanium trichloride, dialkoxytitanium dihalides such as dimethoxytitanium dichloride, diethoxytitanium dichloride, dipropoxytitanium dichloride, and di-n-butoxytitanium dichloride, and trialkoxytitanium halides such as trimethoxytitanium chloride, triethoxytitanium chloride, tripropoxytitanium chloride, and tri-n-butoxytitanium chloride. Among these, halogen-containing titanium compounds are preferable, titanium tetrahalides such as titanium tetrachloride, titanium tetrabromide, and titanium tetraiodide are more preferable, and titanium tetrachloride is particularly preferable. These titanium compounds may be used either alone or in a combination. The tetravalent titanium compound represented by the general formula (3) may be used in a state in which the tetravalent titanium compound is diluted with a hydrocarbon compound, a halogenated hydrocarbon compound, or the like.

A halogen compound other than the titanium compound may optionally be used to produce the solid catalyst component (I). Examples of the halogen compound include a tetravalent halogen-containing silicon compound. Specific examples of the halogen compound include a silane tetrahalide such as tetrachlorosilane (silicon tetrachloride) and tetrabromosilane, and an alkoxy group-containing halogenated silane such as methoxytrichlorosilane, ethoxytrichlorosilane, propoxytrichlorosilane, n-butoxytrichlorosilane, dimethoxydichlorosilane, diethoxydichlorosilane, dipropoxydichlorosilane, di-n-butoxydichlorosilane, trimethoxychlorosilane, triethoxychlorosilane, tripropoxychlorosilane, and tri-n-butoxychlorosilane.

In the process for producing the solid catalyst component for olefin polymerization according to the present invention, the vanadium compound is not particularly limited.

The above vanadium compound is, for example, one or more vanadium compound selected from $VBr_2$, $VBr_3$, $VBr_4$, VC, $VCl_2$, $VCl_3$, $VCl_4$, $VCl_5$, $VF_2$, $VF_3$, $VF_4$, $VF_5$, $VI_2$, $VI_3$, VO, $VO_2$, $V_2O_3$, $V_2O_5$, VBrO, $VBr_2O$, $VBr_3O$, $V(C_5H_5)_2$, VClO, $VClO_2$, $VCl_2O$, $VCl_3O$, $V(CO)_6$, VFO, $VF_2O$, $VF_3O$, $VI_2O$, $V(OH)_3$, $VSO_4$, $V_2(SO_4)_3$, $V(C_5H_5)Cl_3$, $V(C_5H_5)_2Cl_2$, $V(CH_3COO)_2$, $V(CH_3COO)_3$, $VO(OCH_3)Cl_2$, $VO(OC_2H_5)Cl_2$, $VO(OC_2H_5)_{1.5}Cl_{1.5}$, $VO(OCH_3)_2Cl$, $VO(OC_2H_5)_3$, $V(C_5H_5)_2Cl_2$, $V(C_{10}H_{10})Cl_2$, $V(CH_3COCH_2COCH_3)_3$, $V((CH_3CHCH_3COCH_3))_3$, and preferably one or more vanadium compound selected from $VCl_3O$, $VCl_3$, $VCl_4$, $V(C_5H_5)_2Cl_2$, $V(CH_3COCH_2COCH_3)_3$.

The internal electron donor compound used to produce the solid catalyst component (I) is preferably the component (A) included in the solid catalyst component (I), and description thereof is omitted.

A polysiloxane that is optionally used to produce the solid catalyst component (I) is the same as the polysiloxane that is optionally included in the solid catalyst component (I), and description thereof is omitted.

In particular, any of the processes 1 to 8 described below can be cited as the process for preparing the solid catalyst component (1).

1. A solid component obtained by co-grinding at least one magnesium compound selected from the group comprising alkyl magnesium halide, dihalogenated magnesium, and dialkoxymagnesium, an electron donor compound and a vanadium compound and a titanium compound is suspended in a solvent, then is heat treated together with the solvent.

2. A solid component obtained by the reaction of at least one magnesium compound selected from the group comprising alkyl magnesium halide, dihalogenated magnesium, and dialkoxymagnesium and an electron donor compound is suspended in a solvent, then is heat treated together with the solvent in the coexistence of a vanadium compound and a titanium compound.

3. In the process of contacting at least one magnesium compound selected from the group comprising alkyl magnesium halide, dihalogenated magnesium, and dialkoxymagnesium and an electron donor compound with a halogenated titanium, they are heat treated together with a solvent in the coexistence of a vanadium compound.

4. When the reaction of a solid catalyst component treated with a Mg compound, a Ti compound and an electron donor with a tetravalent titanium halide is repeated two or more times, a vanadium compound is added in each process or in any process.

5. When the reaction of a solid catalyst component treated with a Mg compound, a Ti compound and an electron donor with a tetravalent titanium halide and an electron donor compound is repeated two or more times, a vanadium compound is added.

6. When the reaction of a solid catalyst component treated with a Mg compound, a Ti compound and an electron donor with an electron donor compound is repeated two or more times, a vanadium compound is added.

7. When a solid catalyst component treated with a Mg compound, a Ti compound and an electron donor is washed with a solvent, a vanadium compound is added.

8. A vanadium compound is added to a solid catalyst component obtained by treating with a Mg compound, a Ti compound and an electron donor.

The added amount of the above vanadium compound is preferably 0.01 to 10 mol, more preferably 0.05 to 5, and further preferably 0.1 to 3, in terms of vanadium atom, based on 1 mol of Ti atom included in the Ti compound used.

It is also preferable to bring the solid catalyst component (I) obtained by the above method into contact with the organosilicon compound that includes an Si—O—C linkage, the organosilicon compound that includes an Si—N—C linkage, the organoaluminum compound (optional), and the organosilicon compound represented by the general formula (2) (optional), from the viewpoint of improving the polymerization activity of the solid catalyst component, and improving the hydrogen response. The solid catalyst component (I) is brought into contact with these compounds in the presence of a hydrocarbon solvent. After bringing the solid catalyst component (I) into contact with each component, the mixture is sufficiently washed with a hydrocarbon solvent to remove unnecessary components. The solid catalyst component (I) may be repeatedly brought into contact with each compound.

The components are brought into contact with each other at −10 to 100° C., preferably 0 to 90° C., and particularly preferably 20 to 80° C. The contact time is 1 minute to 10 hours, preferably 10 minutes to 5 hours, and particularly preferably 30 minutes to 2 hours. The components may be used in an arbitrary ratio as long as the advantageous effects of the invention are not adversely affected. The organosilicon compound that includes an Si—O—C linkage, the organosilicon compound that includes an Si—N—C linkage, and the organosilicon compound represented by the general formula (2) are normally used in an amount of 0.2 to 20 mol, preferably 0.5 to 10 mol, and particularly preferably 1 to 5 mol, per mol of the titanium atoms included in the solid catalyst component (I). The organoaluminum compound is normally used in an amount of 0.5 to 50 mol, preferably 1 to 20 mol, and particularly preferably 1.5 to 10 mol, per mol of the titanium atoms included in the solid catalyst component (I).

It is preferable to remove the solvent from the resulting solid catalyst component (I) so that the weight ratio of the solvent relative to the solid component is 1/3 or less, and preferably 1/6 to 1/20, to obtain a powdery solid component.

The ratio of the components used when producing the solid catalyst component (I) is determined taking account of the production method. For example, the tetravalent titanium halide compound is used in an amount of 0.5 to 100 mol, preferably 0.5 to 50 mol, and more preferably 1 to 10 mol, based on 1 mol of the magnesium compound. The polysiloxane is used in an amount of 0.01 to 100 g, preferably 0.05 to 80 g, and still more preferably 1 to 50 g, based on 1 mol of the magnesium compound.

Olefin Polymerization Catalyst

An olefin polymerization catalyst comprising the above mentioned solid catalyst component for olefin polymerization, an organoaluminum promoter, and an optional external electron donor.

Note that an optional external electron donor may not be used when the solid catalyst component (I) includes the organosilicon compound that includes an Si—O—C linkage, the organosilicon compound that includes an Si—N—C linkage, or the organoaluminum compound (reagent), or when the solid catalyst component that includes the reagent further includes the organosilicon compound represented by the general formula (2). Specifically, the catalyst that includes the solid catalyst component and the organoaluminum compound exhibits excellent polymerization activity, and ensures excellent hydrogen response, even when an optional external electron donor is not used.

Specific examples of the organoaluminum compound include trialkylaluminums such as triethylaluminum, triisopropylaluminum, tri-n-butylaluminum, tri-n-hexylaluminum, and triisobutylaluminum, alkylaluminum halides such as diethylaluminum chloride and diethylaluminum bromide, diethylaluminum hydride, and the like. Among these, alkylaluminum halides such as diethylaluminum chloride, and trialkylaluminums such as triethylaluminum, tri-n-butylaluminum, and triisobutylaluminum are preferable, and triethylaluminum and triisobutylaluminum are particularly preferable. These organoaluminum compounds may be used either alone or in combination.

Examples of the external electron donor compound used to produce the polymerization catalyst used in connection with one embodiment of the invention include an organic compound that includes an oxygen atom or a nitrogen atom. Examples of the organic compound that includes an oxygen atom or a nitrogen atom include an alcohol, a phenol, an ether, an ester, a ketone, an acid halide, an aldehyde, an amine, an amide, a nitrile, an isocyanate, and an organosilicon compound. The external electron donor compound may be an organosilicon compound that includes an Si—O—C linkage, an aminosilane compound that includes an Si—N—C linkage, or the like.

Among these, an ester such as ethyl benzoate, ethyl p-methoxybenzoate, ethyl p-ethoxybenzoate, methyl p-toluate, ethyl p-toluate, methyl anisate, and ethyl anisate, a 1,3-diether, an organosilicon compound that includes an Si—O—C linkage, and an aminosilane compound that includes an Si—N—C linkage are preferable, and an organosilicon compound that includes an Si—O—C linkage, an aminosilane compound that includes an Si—N—C linkage, and a 2-substituted 1,3-diether are particularly preferable.

Examples of the organosilicon compound that includes an Si—O—C linkage that may be used as the external electron donor compound (III) include an organosilicon compound represented by the following general formula (4).

$$R^6_q Si(OR^7)_{4-q} \qquad (4)$$

wherein $R^6$ is an alkyl group having 1 to 12 carbon atoms, a vinyl group, an alkenyl group having 3 to 12 carbon atoms, a cycloalkyl group having 3 to 12 carbon atoms, a cycloalkenyl group having 3 to 12 carbon atoms, an aromatic hydrocarbon group having 6 to 15 carbon atoms, or a substituted aromatic hydrocarbon group, provided that a plurality of $R^6$ are either identical or different when a plurality of $R^6$ are present, $R^7$ is an alkyl group having 1 to 4 carbon atoms, a vinyl group, an alkenyl group having 3 to 12 carbon atoms, a cycloalkyl group having 3 to 6 carbon atoms, an aromatic hydrocarbon group having 6 to 12 carbon atoms, or a substituted aromatic hydrocarbon group having 7 to 12 carbon atoms, provided that a plurality of $R^7$ are either identical or different when a plurality of $R^7$ are present, and q is an integer from 0 to 3.

Examples of the aminosilane compound that includes an Si—N—C linkage that may be used as the external electron donor compound (III) include an aminosilane compound represented by the following general formula (5).

$$(R^8 R^9 N)_s SiR^{10}_{4-s} \qquad (5)$$

wherein $R^8$ and $R^9$ are a hydrogen atom, an alkyl group having 1 to 20 carbon atoms, a vinyl group, an alkenyl group having 3 to 20 carbon atoms, a cycloalkyl group having 3 to 20 carbon atoms, a cycloalkenyl group having 3 to 20 carbon atoms, or an aryl group having 6 to 20 carbon atoms, provided that $R^8$ and $R^9$ are either identical or different, and optionally bond to each other to form a ring, $R^{10}$ is an alkyl group having 1 to 20 carbon atoms, a vinyl group, an alkenyl group having 3 to 12 carbon atoms, an alkoxy group having 1 to 20 carbon atoms, a vinyloxy group, an alkenyloxy group having 3 to 20 carbon atoms, a cycloalkyl group having 3 to 20 carbon atoms, a cycloalkyloxy group having 3 to 20 carbon atoms, an aryl group having 6 to 20 carbon atoms, or an aryloxy group having 6 to 20 carbon atoms, provided that a plurality of $R^8$ are either identical or different when a plurality of $R^8$ are present, and s is an integer from 1 to 3.

Examples of the organosilicon compound represented by the general formula (4) or (5) include phenylalkoxysilanes, alkylalkoxysilanes, phenylalkylalkoxysilanes, cycloalkylalkoxysilanes, alkyl(cycloalkyl)alkoxysilanes, (alkylamino) alkoxysilanes, alkyl(alkyl amino)alkoxysilanes, cycloalkyl (alkyl amino)alkoxysilanes, tetraalkoxysilanes, tetrakis (alkyl amino)silanes, alkyltris(alkylamino)silanes, dialkylbis (alkylamino)silanes, trialkyl(alkylamino)silanes, and the like. Specific examples of the organosilicon compound represented by the general formula (4) or (5) include n-propyltriethoxysilane, cyclopentyltriethoxysilane, phenyltrimethoxysilane, phenyltriethoxysilane, t-butyltrimethoxysilane, diisopropyldimethoxysilane, isopropylisobutyldimethoxysilane, diisopentydimethoxysilane, bis(2-ethylhexyl)dimethoxysilane, t-butylmethyldimethoxysilane, t-butylethyldimethoxysilane, dicyclopentyldimethoxysilane, dicyclohexyldimethoxysilane, cyclohexylcyclopentyldimethoxysilane, cyclohexylmethyldimethoxysilane, tetraethoxysilane, tetrabutoxysilane, bis (ethyl amino)methylethylsilane, bis(ethylamino)-t-butylmethylsilane, bis(ethylamino)dicyclohexylsilane, dicyclopentylbis(ethylamino)silane, bis(methylamino) (methylcyclopentylamino)methylsilane, diethylaminotriethoxysilane, bis(cyclohexylamino)dimethoxysilane, bis (perhydroisoquinolino)dimethoxysilane, bis (perhydroquinolino)dimethoxysilane, ethyl(isoquinolino) dimethoxysilane, and the like. The external electron donor compound (III) may be one or more compounds selected from n-propyltriethoxysilane, phenyltrimethoxysilane, t-butylmethyldimethoxysilane, t-butylethyldimethoxysilane, diisopropyldimethoxysilane, isopropylisobutyldimethoxysilane, diisopentyldimethoxysilane, diphenyldimethoxysilane, dicyclopentyldimethoxysilane, cyclohexylmethyldimethoxysilane, tetramethoxysilane, tetraethoxysilane, t-butylmethylbis(ethylamino)silane, bis(ethylamino)dicyclohexylsilane, dicyclopentylbis(ethylamino)silane, bis(perhydroisoquinolino)dimethoxysilane, diethylaminotriethoxysilane, and the like.

Method for Copolymerizing Propylene and α-Olefin

In one embodiment of the invention, propylene and an α-olefin are copolymerized in the presence of the copolymerization catalyst to produce a propylene-based block copolymer. The a-olefin may be at least one olefin selected from an a-olefin having 2 to 20 carbon atoms (excluding propylene having 3 carbon atoms). Examples of the a-olefin include ethylene, 1-butene, 1-pentene, 4-methyl-1-pentene, vinylcyclohexane, and the like. These a-olefins may be used either alone or in combination. Among these, ethylene and 1-butene are preferable, and ethylene is particularly preferable.

Examples of the copolymerization method used in connection with one embodiment of the invention include a slurry polymerization method that utilizes an inert hydrocarbon solvent such as cyclohexane or heptane, a bulk polymerization method that utilizes a solvent such as liquefied propylene, and a vapor-phase polymerization method that substantially does not utilize a solvent. A block copolymer can be obtained by repeatedly implementing such a polymerization method in a plurality of steps. A combination of the bulk polymerization method and the vapor-phase polymerization method, or a multistep vapor-phase polymerization method is preferable as the copolymerization method.

It is preferable to homopolymerize propylene, or copolymerize propylene and a small amount of a-olefin (particularly ethylene) in the first step, and copolymerize propylene and an α-olefin (particularly ethylene), or copolymerize propylene, ethylene, and 1-butene in the second step. Note that the first step and the second step may respectively be performed a plurality of times.

It is preferable to effect polymerization in the first step while adjusting the polymerization temperature and the polymerization time so that 20 to 90 wt % of the propylene-based block copolymer is obtained. It is preferable to introduce propylene and ethylene or another a-olefin in the second step, and polymerize the components so that the ratio of the rubber part such as an ethylene-propylene rubber (EPR) or an ethylene-propylene-1-butene ternary copolymer is 10 to 80 wt %.

The polymerization temperature in the first step and the second step is 200° C. or less, and preferably 100° C. or less. The polymerization pressure in the first step and the second step is 10 MPa or less, and preferably 5 MPa or less. The polymerization time in each step (the residence time when implementing continuous polymerization) is normally 1 minute to 5 hours. The copolymerization method used in connection with one embodiment of the invention may be implemented using a continuous polymerization method or a batch polymerization method. Each of the first-step polymerization reaction and the second-step polymerization reaction may be implemented in a single step or a plurality of steps. When the first-step polymerization reaction or the second-step polymerization reaction is implemented in a plurality of steps, each step may be implemented under identical conditions or different conditions. It is preferable that the second-step polymerization reaction be a vapor-phase polymerization reaction since elution of EPR from polypropylene (PP) particles can be suppressed.

The catalyst components may be used for copolymerization in an arbitrary ratio as long as the advantageous effects of the invention are not impaired. The organoaluminum compound is normally used in an amount of 1 to 2000 mol, and preferably 50 to 1000 mol, per mol of the titanium atoms included in the solid catalyst component (I). The external electron donor compound is normally used in an amount of 0.002 to 10 mol, preferably 0.01 to 2 mol, and particularly preferably 0.01 to 0.5 mol, per mol of the organoaluminum component. The components may be brought into contact with each other in an arbitrary order. It is desirable to add the organoaluminum compound to the polymerization system, and bring the component (I) into contact with the organoaluminum compound.

When copolymerizing an olefin using the catalyst that includes the solid catalyst component, the organoaluminum compound, and the external electron donor compound (hereinafter may be referred to as "main polymerization"), it is desirable to effect preliminary polymerization prior to the main polymerization in order to further improve the catalytic activity, the stereoregularity, the particle properties of the resulting polymer, and the like. An olefin that is subjected to the main polymerization, or a monomer such as styrene, may be used for the preliminary polymerization.

The components and the monomer may be brought into contact with each other in an arbitrary order when effecting the preliminary polymerization. Note that it is preferable to add the organoaluminum component to the preliminary polymerization system containing an inert gas atmosphere or an olefin gas atmosphere, bring the solid catalyst component (I) into contact with the organoaluminum component, and then bring the olefin (e.g., propylene), or a mixture of propylene and one or more additional olefins, into contact with the above mixture.

When effecting the preliminary polymerization using the component, it is desirable to add the organoaluminum component to the preliminary polymerization system containing an inert gas atmosphere or an olefin gas atmosphere, bring the external electron donor component into contact with the organoaluminum component, bring the solid catalyst component (I) into contact with the mixture, and then bring the olefin (e.g., propylene), or a mixture of propylene and one or more additional olefins, into contact with the above mixture.

A large amount of rubber can be incorporated in the resulting block copolymer under identical conditions by utilizing the production method according to one embodiment of the invention that utilizes the above catalyst, and the resulting block copolymer can be applied to a wide range of products. It is also possible to achieve high sustainability of polymerization of the rubber part, and control the properties of the rubber part through multistep polymerization.

Copolymer of Propylene and a-Olefin

A block copolymer obtained using the method according to one embodiment of the invention is normally a polymer that includes segments in which the composition of two or more monomers changes consecutively.

Specifically, a block copolymer is normally a polymer in which two or more polymer chains (segments) that differ in polymer primary structure (e.g., type of monomer, type of comonomer, comonomer composition, comonomer content, comonomer sequence, and stereoregularity) are linked within one molecular chain. A propylene-based block copolymer obtained using the method according to one embodiment of the invention is characterized in that polymers that differ in monomer composition are produced by multistep polymerization. Specifically, the main part of the propylene-based block copolymer has a structure in which two or more polymers that differ in monomer composition are present in each polymer particle in a mixed state (some of the polymers are linked through the polymer chain).

The propylene-based block copolymer obtained using the method according to one embodiment of the invention exhibits moderate rigidity due to the presence of crystalline polypropylene, or a crystalline polypropylene-based random copolymer that includes crystalline polypropylene and a small amount of a-olefin (e.g., ethylene) (crystalline PP or homopolymerization part), and exhibits excellent impact resistance due to the presence of a random copolymer (e.g., ethylene-propylene rubber (EPR or rubber part)) obtained by second-step polymerization. The balance between rigidity and impact resistance varies depending on the ratio of crystalline PP and the rubber part. The propylene-based block copolymer obtained by the method according to one embodiment of the invention includes the rubber part in a high ratio since the polymerization activity (block ratio) of the rubber part obtained by second-step polymerization is high. Since a large amount of a-olefin (e.g., ethylene) is introduced into the random copolymer, the copolymer exhibits relatively high rigidity with respect to the amount of rubber part and the ethylene content in the crystalline part. The copolymer exhibits high impact strength with respect to a polymer that includes an identical rubber part.

EXAMPLES

The invention is further described below by way of examples. Note that the following examples are for illustration purposes only, and the invention is not limited to the following examples. In the examples and comparative examples, the sphericity of the dialkoxymagnesium particles, and the content of magnesium atoms, titanium atoms, halogen atoms, and the internal electron donor compound in the solid catalyst component were measured as described below.

Content of Magnesium Atoms in Solid Catalyst Component

The solid catalyst component from which the solvent component had been completely removed by heating (drying) under reduced pressure was weighed, and dissolved in a hydrochloric acid solution. After the addition of methyl orange (indicator) and a saturated ammonium chloride solution, the mixture was neutralized with aqueous ammonia, heated, cooled, and filtered to remove a precipitate (titanium hydroxide). A given amount of the filtrate was isolated preparatively, and heated. After the addition of a buffer and an EBT mixed indicator, magnesium atoms were titrated using an EDTA solution to determine the content of magnesium atoms in the solid catalyst component (EDTA titration method).

Content of Titanium Atoms in Solid Catalyst Component

The content of titanium atoms in the solid catalyst component was determined in accordance with the method (redox titration) specified in JIS M 8311-1997 ("Method for determination of titanium in titanium ores").

Content of Halogen Atoms in Solid Catalyst Component

The solid catalyst component from which the solvent component had been completely removed by heating (drying) under reduced pressure was weighed, and treated with a mixture of sulfuric acid and purified water to obtain an aqueous solution. A given amount of the aqueous solution was isolated preparatively, and halogen atoms were titrated with a silver nitrate standard solution using an automatic titration device ("COM-1500" manufactured by Hiranuma Sangyo Co., Ltd.) to determine the content of halogen atoms in the solid catalyst component (silver nitrate titration method).

Content of Vanadium Atoms in Solid Catalyst Component

The solid catalyst component from which the solvent component had been completely removed by heating (drying) under reduced pressure was weighed, and dissolved in a dilute sulfuric acid solution followed by adding demineralized water to adjust the amount of the solution to 100 mL. By using the vanadium-containing solution, the content of vanadium atoms in the solid catalyst component was determined with an inductively coupled plasma emission spectrophotometer ("SPS-3100" manufactured by SII nanotechnology Co., Ltd.). The number of moles of vanadium compound was calculated from the inductively coupled plasma emission spectrophotometer measurement results using a calibration curve that was drawn in advance using the measurement results at a known concentration.

Content of Internal Electron Donor Compound in Solid Catalyst Component

The content of the internal electron donor compound (first internal electron donor compound, second internal electron donor compound, and third internal electron donor compound) in the solid catalyst component was determined using a gas chromatograph ("GC-14B" manufactured by Shimadzu Corporation) under the following conditions. The number of moles of each component (each internal electron donor compound) was calculated from the gas chromatography measurement results using a calibration curve that was drawn in advance using the measurement results at a known concentration.

Measurement Conditions

Column: packed column (2.6 (diameter)×2.1 m, Silicone SE-30 10%,

Chromosorb WAW DMCS 80/100, manufactured by GL Sciences Ltd.)

Detector: flame ionization detector (FID)

Carrier gas: helium, flow rate: 40 ml/min

Measurement temperature: vaporization chamber: 280° C., column: 225° C., detector: 280° C., or vaporization chamber: 265° C., column: 180° C., detector: 265° C.

Example 1

Synthesis of Solid Catalyst Component (A1)
(1) First Step
A 500 ml round bottom flask equipped with a stirrer in which the internal atmosphere had been sufficiently replaced by nitrogen gas, was charged with 40 ml (364 mmol) of titanium tetrachloride and 60 ml (565 mmol) of toluene to prepare a solution.

A suspension prepared using 20 g (175 mmol) of spherical diethoxymagnesium (diameter=61 μm), 80 ml (753 mmol) of toluene, and 1.8 ml (7.8 mmol) of di-n-propyl phthalate was added to the solution. The mixture was stirred at −5° C. for 1 hour, and heated to 110° C. 3.6 ml (15.5 mmol) of di-n-propyl phthalate was added stepwise to the mixture while heating the mixture. After reacting the mixture at 110° C. for 2 hours with stirring, the reaction mixture was allowed to stand, and the supernatant liquid was removed to obtain reaction product slurry.

After the addition of 187 ml of toluene (100° C.) to the reaction product slurry, the mixture was stirred and allowed to stand, and the supernatant liquid was removed. This operation was repeated four times to wash the reaction product to obtain reaction product slurry including a solid component (I).

(2) Second Step
158 ml (1487 mmol) of toluene and 30 ml (273 mmol) of titanium tetrachloride were added to the reaction product slurry including the solid component (I). The mixture was heated to 110° C., and reacted for 2 hours with stirring. After completion of the reaction, the supernatant liquid was removed. After the addition of 180 ml of toluene and 20 ml (182 mmol) of titanium tetrachloride, the mixture was heated to 80° C. After the addition of 0.5 ml (2.2 mmol) of di-n-propyl phthalate, the mixture was heated to 110° C., and reacted for 2 hours with stirring. The resulting reaction mixture was allowed to stand, and the supernatant liquid was removed to obtain reaction product slurry.

After completion of the reaction, 187 ml of toluene (100° C.) was added to the reaction product slurry, the mixture was stirred and allowed to stand, and the supernatant liquid was removed. This operation was repeated twice to wash the reaction product to obtain reaction product slurry including a solid component (II).

(3) Third Step
170 ml (1600 mmol) of toluene was added to the reaction product slurry including the solid component (II) to adjust the concentration of titanium tetrachloride in the reaction mixture to 0.2 mass %, and the mixture was heated to 80° C. After the addition of 0.5 ml (2.5 mmol) of diethyl phthalate, the mixture was reacted at 100° C. for 1 hour with stirring. The resulting reaction mixture was allowed to stand, and the supernatant liquid was removed to obtain reaction product slurry.

After the addition of 150 ml of n-heptane (60° C.) to the reaction product slurry, the mixture was stirred and allowed to stand, and the supernatant liquid was removed. This operation was repeated 7 times to wash the reaction product to obtain a solid catalyst component (a1) for olefin polymerization.

The solid catalyst component (a1) had a magnesium atom content of 18.0 mass %, a titanium atom content of 2.3 mass %, a halogen atom content of 59.2 mass %, and a total phthalic diester content of 18 mass %.

(4) Forth Step
120 ml of toluene and 6.9 ml (73 mmol) of vanadium oxytrichloride were added to 15 g of the solid catalyst component (a1) and the mixture was heated to 80° C. for 1 hour with stirring. The resulting reaction mixture was allowed to stand, and the supernatant liquid was removed to obtain reaction product slurry.

After the addition of 150 ml of n-heptane (room temperature) to the reaction product slurry, the mixture was stirred and allowed to stand, and the supernatant liquid was removed. This operation was repeated 3 times to wash the reaction product to obtain a solid catalyst component (A1) for olefin polymerization.

The solid catalyst component (A1) had a titanium atom content of 1.7 mass %, a vanadium atom content of 0.3 mass %, and a total phthalic diester content of 19.0 mass %.

Preparation of Ethylene-Propylene Copolymerization Catalyst and Production of Impact Copolymer An autoclave (internal volume: 2.0 l) equipped with a stirrer in which the internal atmosphere had been completely replaced by nitrogen gas, was charged with 2.2 mmol of triethylaluminum, 0.22 mmol of diethylaminotriethoxysilane, and the solid catalyst component (A1) (0.37 μmol on a titanium atom basis) to prepare an ethylene-propylene copolymerization catalyst.

An autoclave equipped with a stirrer was charged with the ethylene-propylene copolymerization catalyst, and further charged with liquefied propylene (15 mol) and hydrogen gas (partial pressure: 0.20 MPa). The liquefied propylene was subjected to preliminary polymerization at 20° C. for 5 minutes, and subjected to first-step homopropylene polymerization (homopolymerization) at 70° C. for 60 minutes. The pressure inside the autoclave was then returned to normal pressure.

Before starting copolymerization step, 0.70 MPa of propylene, 0.49 MPa of ethylene, and 0.018 MPa of hydrogen and 0.8 μmol of ethyl trichloroacetate were added to the autoclave. The mixture was heated to 70° C., and reacted at 70° C. for 1 hour under a pressure of 1.2 MPa while feeding ethylene, propylene, and hydrogen in a ratio of 1.6/2.4/0.093 (l/min) to obtain an ethylene-propylene copolymer. The polymerization results are shown in Table 1.

The propylene-based block copolymerization activity (ICP (impact copolymer) activity) (g-ICP/(g-cat)) and the polymerization ratio (block ratio) (wt %) of the copolymerization part were measured as described below to evaluate the sustainability of polymerization activity. The MFR of the homopolymer, the MFR of the ICP, the EPR content (rubber content) (wt %) in the propylene-based block copolymer, the ethylene content (wt %) in the EPR, the ethylene content (wt %) in the xylene-insoluble component, the flexural modulus (FM) (MPa), and the Izod impact strength (KJ/m2) were also measured. The results are shown in Table 1.

ICP Polymerization Activity
The propylene-based block copolymerization activity per gram of the solid catalyst component was calculated by the following expression.

Propylene-based block copolymerization activity (g-ICP/g-catalyst)=$(I$ (g)$-F$ (g)$+J$ (g))/[{mass (g) of solid catalyst component in olefin polymerization catalyst×$((G$ (g)$-F$ (g)$-J$ (g))}/$(G$ (g)$-F$ (g)))]

Note that I is the mass (g) of the autoclave after completion of copolymerization, F is the mass (g) of the autoclave, G is the mass (g) of the autoclave after unreacted monomers had been removed after completion of PP homopolymerization, and J is the amount (g) of polymer removed after homopoymerization.

Homopolymerization Activity

The homopolymerization activity per gram of solid catalyst component was calculated by the following expression.

homopolymerization activity (g-PP/g-catalyst)=($G$ (g)–$F$ (g)/(mass (g) of solid catalyst component in olefin polymerization catalyst).

Block ratio (mass %)

Block ratio (mass %)={($I$ (g)–$G$ (g)+$J$ (g))/($I$ (g)–$F$ (g))}×100

Note that I is the mass (g) of the autoclave after completion of copolymerization, G is the mass (g) of the autoclave after unreacted monomers had been removed after completion of PP homopolymerization, J is the amount (g) of polymer removed after homopolymerization, and F is the mass (g) of the autoclave.

EPR Content (Xylene-Soluble Content in ICP Polymer)

A flask equipped with a stirrer was charged with 5.0 g of the copolymer (ICP propylene polymer) and 250 ml of p-xylene. The external temperature was increased to be equal to or higher than the boiling point of xylene (about 150° C.), and the polymer was dissolved over 2 hours while maintaining p-xylene contained in the flask at the boiling point (137 to 138° C.). The solution was cooled to 23° C. over 1 hour, and an insoluble component and a soluble component were separated by filtration. A solution of the soluble component was collected, and p-xylene was evaporated by heating (drying) under reduced pressure. The weight of the residue was calculated, and the relative ratio (mass %) relative to the polymer (propylene-based block copolymer) was calculated to determine the EPR content.

Determination of Ethylene Content in EPR

A small amount of EPR (xylene-soluble component) that was extracted with xylene when determining the EPR content (xylene-soluble content in the ICP polymer) was sampled, and hot-pressed in the shape of a film. The ethylene content in the EPR was calculated from the absorbance measured using a Fourier transform infrared spectrometer (FT-IR) ("Avatar" manufactured by Thermo Nicolet) based on a calibration curve drawn using a plurality of samples having a known ethylene content.

Measurement wavelength: 720 cm-1 and 1150 cm-1
Film thickness: 0.1 to 0.2 mm

Ethylene Content in Xylene-Insoluble (XI) Component

A small amount of the xylene-insoluble component obtained by extraction with xylene was sampled, and hot-pressed in the shape of a film, and the ethylene content in the xylene-insoluble component was calculated in the same manner as the ethylene content in the EPR.

Melt Flow Rate (MFR) of Polymer

The melt flow rate (MFR) (melt flow index) (g/10 min) of homopolypropylene and the ICP polymer was measured in accordance with ASTM 01238 (JIS K 7210).

The Intrinsic Viscosity of EPR (I.V.-EPR)

The intrinsic viscosity of EPR (I.V.-EPR) was calculated by using following formula (Huggins equation) from the reduced viscosity ($\eta SP/c$) measured in decalin at 135° C. by means of Ubbelohde-type viscometer;

$\eta SP/c=[\eta]+K[\eta]^2 c$ wherein, $\eta SP/c$ (dl/g) is reduced viscosity, $[\eta]$ (dl/g) is intrinsic viscosity, c (g/dl) is polymer concentration, and K is 0.35 (Huggins constant).

Flexural Modulus (FM) of Polymer

The polymer was molded to prepare a property measurement specimen in accordance with JIS K 71 71. The specimen was conditioned in a temperature-controlled room maintained at 23° C. for 144 hours or more, and the flexural modulus (FM) (MPa) was measured using the specimen provided that a liquid/powder exudate was not observed on the surface thereof. Note that the property measurement specimen was prepared as described below. 10 wt % of IRGANOX 1010 (manufactured by BASF), 0.10 wt % of IRGAFOS 168 (manufactured by BASF), and 0.08 wt % of calcium stearate were added to the ethylene-propylene copolymer, and the mixture was kneaded and granulated using a single-screw extruder to obtain pellets of the ethylene-propylene copolymer. The pellets of the ethylene-propylene copolymer were introduced into an injection molding machine (mold temperature: 60° C., cylinder temperature: 230° C.), and injection-molded to prepare the property measurement specimen.

Izod Impact Strength 0.10 wt % of IRGANOX 1010 (manufactured by BASF), 0.10 wt % of IRGAFOS 168 (manufactured by BASF), and 0.08 wt % of calcium stearate were added to the ethylene-propylene copolymer, and the mixture was kneaded and granulated using a single-screw extruder to obtain pellets of the ethylene-propylene copolymer. The pellets of the ethylene-propylene copolymer were introduced into an injection molding machine (mold temperature: 60° C., cylinder temperature: 230° C.), and injection-molded to prepare a property measurement specimen. The specimen was conditioned in a temperature-controlled room maintained at 23° C. for 144 hours or more, and the Izod impact strength of the specimen was measured in accordance with JIS K 7110 ("Method of Izod Impact Test For Rigid Plastics") using an Izod tester ("Model A-121804405" manufactured by Toyo Seiki Seisaku-Sho, Ltd.).

Shape of specimen: ISO 180/4A, thickness: 3.2 mm, width: 12.7 mm, length: 63.5 mm
Shape of notch: type-A notch (radius: 0.25 mm) formed using a die provided with a notch
Temperature: 23° C. and −30° C.
Impact speed: 3.5 m/s
Nominal pendulum energy: 0.5 J (23° C.) and 0.5 J (−30° C.)

Example 2

Synthesis of Solid Catalyst Component (A2)

According to the example 1, catalyst component (a1) was prepared in the same manner, except that fourth step was not carried out. A 100 mL glass bottle was placed in the plastic bag in which the internal atmosphere had been sufficiently replaced by nitrogen gas. Catalyst component (a1) was added to the glass bottle. Mixture solution of 0.23 mL of VOCl3 and 0.23 mL of heptane was added to the catalyst component (a followed by shaking the bottle for 10 minutes and letting it stand for 30 minutes to disperse the mixture solution homogeneously over the catalyst component (a1). This operation was repeated 3 times to obtain a solid catalyst component (A2) for olefin polymerization.

The solid catalyst component (A2) had a titanium content of 1.7 mass %, a vanadium atom content of 0.3 mass %, and total phthalic diester content of 16.6 mass %.

Preparation of Ethylene-Propylene Copolymerization Catalyst and Production of Impact Copolymer A polymerization catalyst (B2) was prepared and evaluated in the same manner as example 1, except that the solid catalyst component (A2) was used instead of the solid catalyst (A1). The polymerization results are shown in Table 1.

Example 3

Synthesis of Solid Catalyst Component (A3)

A solid catalyst component (A3) was prepared in the same manner as example 1, except that 120 ml of toluene and 0.8 ml (7.3 mmol) of vanadium tetrachloride were added to 15 g of the solid catalyst component (a1) at fourth step.

The solid catalyst component (A3) had a titanium atom content of 1.1 mass %, a vanadium atom content of 1.6 mass %, and a total phthalic diester content of 19.1 mass %

Preparation of Ethylene-Propylene Copolymerization Catalyst and Production of Impact Copolymer A polymerization catalyst (B3) was prepared and evaluated in the same manner as example 1, except that the solid catalyst component (A3) was used instead of the solid catalyst (A1). The polymerization results are shown in Table 1.

Example 4

Preparation of Ethylene-Propylene Copolymerization Catalyst and Production of Impact Copolymer A polymerization catalyst (B3) was prepared and evaluated in the same manner as example 3, except that no ethyl trichloroacetate was added to the reactor before copolymerization and the copolymerization was carried out at 60 deg.C. The polymerization results are shown in Table 1.

Example 5

Preparation of Ethylene-Propylene Copolymerization Catalyst and Production of Impact Copolymer A polymerization catalyst (B3) was prepared and evaluated in the same manner as example 3, except that the copolymerization was carried out at 45 deg.C. The polymerization results are shown in Table 1.

Example 6

Preparation of Ethylene-Propylene Copolymerization Catalyst and Production of Impact Copolymer A polymerization catalyst (B3) was prepared and evaluated in the same manner as example 3, except that 0.8 μmol of monochlorocyclohexane was added to the reactor instead of ethyl trichloroacetate before copolymerization and the copolymerization was carried out at 45 deg.C. The polymerization results are shown in Table 1.

Example 7

Preparation of Ethylene-Propylene Copolymerization Catalyst and Production of Impact Copolymer A polymerization catalyst (B3) was prepared and evaluated in the same manner as example 3, except that no ethyl trichloroacetate was added to the reactor before copolymerization and the copolymerization was carried out at 45 deg.C. The polymerization results are shown in Table 1.

Example 8

Preparation of Ethylene-Propylene Copolymerization Catalyst and Production of Impact Copolymer A polymerization catalyst (B3) was prepared in the same manner as example 3. An autoclave equipped with a stirrer was charged with the ethylene-propylene copolymerization catalyst, and further charged with liquefied propylene (15 mol) and hydrogen gas (partial pressure: 0.20 MPa). The liquefied propylene was subjected to preliminary polymerization at 20° C. for 5 minutes, and subjected to first-step homopropylene polymerization (homopolymerization) at 70° C. for 60 minutes. The pressure inside the autoclave was then returned to normal pressure.

Before starting copolymerization step, 0.70 MPa of propylene, 0.49 MPa of ethylene, and 0.010 MPa of hydrogen were added to the autoclave. The mixture was heated to 60° C., and reacted at 60° C. for 1 hour under a pressure of 1.2 MPa while feeding ethylene, propylene, and hydrogen in a ratio of 1.6/2.4/0.015 (l/min) to obtain an ethylene-propylene copolymer.

Example 9

Synthesis of Solid Catalyst Component (A4)

A solid catalyst component (A4) was prepared in the same manner as example 2, except that mixture solution of 0.26 mL of VCl4 and 0.26 mL of heptane was added to the catalyst component (a1).

The solid catalyst component (A4) had a titanium content of 2.0 mass %, a vanadium atom content of 2.0 mass %, and total phthalic diester content of 16.5 mass %.

Preparation of Ethylene-Propylene Copolymerization Catalyst and Production of Impact Copolymer A polymerization catalyst (B4) was prepared and evaluated in the same manner as example 8, except that the solid catalyst component (A4) was used instead of the solid catalyst (A3) and no ethyl trichloroacetate was added to the reactor before copolymerization. The polymerization results are shown in Table 1.

Example 10

Synthesis of Solid Catalyst Component (A5)

A solid catalyst component (A5) was prepared in the same manner as example 1, except that 20 g (175 mmol) of spherical diethoxymagnesium (diameter=43 μm) was used at first step.

Preparation of Ethylene-Propylene Copolymerization Catalyst and Production of Impact Copolymer A polymerization catalyst (85) was prepared and evaluated in the same manner as example 8, except that the solid catalyst component (A5) was used instead of the solid catalyst (A3). The polymerization results are shown in Table 1.

Example 11

Synthesis of Solid Catalyst Component (A6)

Preparation of Solid Catalyst Component (1) First Step

A 500 ml round bottom flask equipped with a stirrer in which the internal atmosphere had been sufficiently replaced by nitrogen gas, was charged with 40 ml (364 mmol) of titanium tetrachloride and 60 ml (565 mmol) of toluene to prepare a solution.

A suspension prepared using 20 g (175 mmol) of spherical diethoxymagnesium (diameter-61 μm), 80 ml (753 mmol) of toluene, and 1.8 ml (7.8 mmol) of din-propyl phthalate was added to the solution. The mixture was stirred at −5° C. for 1 hour, and heated to 110° C. 3.6 ml (15.5 mmol) of di-n-propyl phthalate was added stepwise to the mixture while heating the mixture. After reacting the mixture at 100° C. for 3 hours with stirring, the reaction mixture was allowed to stand, and the supernatant liquid was removed to obtain reaction product slurry.

After the addition of 187 ml of toluene (100° C.) to the reaction product slurry, the mixture was stirred and allowed to stand, and the supernatant liquid was removed. This operation was repeated four times to wash the reaction product to obtain reaction product slurry including a solid component (I).

(2) Second Step 60 ml of toluene, 45 ml of titanium tetrachloride and 5.5 mL of vanadium tetrachloride were added to the reaction product slurry including the solid component (I). The mixture was heated to 110° C., and reacted for 2 hours with stirring. After completion of the reaction, the supernatant liquid was removed. After the addition of 180 ml of toluene and 20 mil (182 mmol) of titanium tetrachloride, the mixture was heated to 80° C. After the addition of 0.5 mil (2.2 mmol) of di-n-propyl phthalate, the mixture was heated to 110° C., and reacted for 2 hours with stirring. The resulting reaction mixture was allowed to stand, and the supernatant liquid was removed to obtain reaction product slurry.

After completion of the reaction, 187 ml of toluene (100° C.) was added to the reaction product slurry, the mixture was stirred and allowed to stand, and the supernatant liquid was removed. This operation was repeated twice to wash the reaction product to obtain reaction product slurry including a solid component (II).

(3) Third Step 170 ml (1600 mmol) of toluene was added to the reaction product slurry including the solid component (II) to adjust the concentration of titanium tetrachloride in the reaction mixture to 0.2 mass %, and the mixture was heated to 80° C. After the addition of 0.5 ml (2.5 mmol) of diethyl phthalate, the mixture was reacted at 100° C. for 1 hour with stirring. The resulting reaction mixture was allowed to stand, and the supernatant liquid was removed to obtain reaction product slurry.

After the addition of 150 ml of n-heptane (60° C.) to the reaction product slurry, the mixture was stirred and allowed to stand, and the supernatant liquid was removed. This operation was repeated 7 times to wash the reaction product to obtain a solid catalyst component (A6) for olefin polymerization.

The solid catalyst component (A6) had a titanium atom content of 0.4 mass %, a vanadium atom content of 6.7 mass %, and a total phthalic diester content of 15.9 mass %.

Preparation of Ethylene-Propylene Copolymerization Catalyst and Production of Impact Copolymer A polymerization catalyst (B6) was prepared and evaluated in the same manner as example 8, except that the solid catalyst component (A6) was used instead of the solid catalyst (A3). The polymerization results are shown in Table 1.

Example 12

Synthesis of Solid Catalyst Component (A7)

A solid catalyst component (A7) was prepared in the same manner as example 11, except that 60 mL of toluene, 49 mL of titanium tetrachloride and 1 mL of vanadium tetrachloride was added at the second step.

The solid catalyst component (A7) had a titanium atom content of 1.5 mass %, a vanadium atom content of 0.8 mass %, and a total phthalic diester content of 19.8 mass %.

Preparation of Ethylene-Propylene Copolymerization Catalyst and Production of Impact Copolymer A polymerization catalyst (B7) was prepared and evaluated in the same manner as example 8, except that the solid catalyst component (A7) was used instead of the solid catalyst (A3). The polymerization results are shown in Table 1.

Example 13

Synthesis of Solid Catalyst Component (A8)

A 500 ml round bottom flask equipped with a stirrer in which the internal atmosphere had been sufficiently replaced by nitrogen gas, was charged with 20 g of diethoxymagnesium (diameter=43 μm), 110 mL of toluene, 40 mL of titanium tetrachloride. The mixture was heated to 60° C. After the addition of 8.2 ml (30.6 mmol) of diethyl diisopropylsuccinate, the mixture was heated to 100° C., and reacted for 2 hours with stirring. The resulting reaction mixture was allowed to stand, and the supernatant liquid was removed to obtain reaction product slurry.

After completion of the reaction, 90 ml of toluene (100° C.) was added to the reaction product slurry, the mixture was stirred and allowed to stand, and the supernatant liquid was removed. This operation was repeated 6 times to wash the reaction product to obtain reaction product slurry including a solid component.

100 ml of toluene and 20 ml of titanium tetrachloride were added to the reaction product slurry including the solid component. The mixture was heated to 100° C., and reacted for 15 minutes with stirring. After completion of the reaction, the supernatant liquid was removed. This operation was repeated 3 times followed by the addition of 150 ml of n-heptane (40° C.) to the reaction product slurry, the mixture was stirred and allowed to stand, and the supernatant liquid was removed. This operation was repeated 6 times to wash the reaction product to obtain a solid catalyst component for olefin polymerization.

80 ml of toluene and 0.5 ml of vanadium tetrachloride were added to 10 g of the solid catalyst component and the mixture was heated to 80° C. for 1 hour with stirring. The resulting reaction mixture was allowed to stand, and the supernatant liquid was removed to obtain reaction product slurry.

After the addition of 100 ml of n-heptane (room temperature) to the reaction product slurry, the mixture was stirred and allowed to stand, and the supernatant liquid was removed. This operation was repeated 3 times to wash the reaction product to obtain a solid catalyst component (A8) for olefin polymerization.

The solid catalyst component (A8) had a titanium atom content of 1.0 mass %, a vanadium atom content of 2.1 mass %, and a diethyl diisopropylsuccinate content of 19.8 mass %.

Preparation of Ethylene-Propylene Copolymerization Catalyst and Production of Impact Copolymer A polymerization catalyst (B8) was prepared and evaluated in the same manner as example 8, except that the solid catalyst component (A8) was used instead of the solid catalyst (A3). The polymerization results are shown in Table 1.

Comparative Example 1

Synthesis of Solid Catalyst Component (A9)

A solid catalyst component (A9) was prepared in the same manner as example 1, except that fourth step was not carried out.

Preparation of Ethylene-Propylene Copolymerization Catalyst and Production of Impact Copolymer A polymerization catalyst (B9) was prepared and evaluated in the same manner as example 3, except that the solid catalyst component (A9) was used instead of the solid catalyst (A3) and no ethyl trichloroacetate was added to the reactor before copolymerization. The polymerization results are shown in Table 1.

Comparative Example 2

Preparation of Ethylene-Propylene Copolymerization Catalyst and Production of Impact Copolymer A polymerization catalyst (B9) was prepared and evaluated in the same manner as comparative example 1, except that copolymerization was carried out at 60 deg.C. The polymerization results are shown in Table 1.

Comparative Example 3

Preparation of Ethylene-Propylene Copolymerization Catalyst and Production of Impact Copolymer A polymerization catalyst (B9) was prepared and evaluated in the same manner as comparative example 1, except that copolymerization was carried out at 45 deg.C. The polymerization results are shown in Table 1.

Comparative Example 4

Preparation of Ethylene-Propylene Copolymerization Catalyst and Production of Impact Copolymer A polymerization catalyst (B9) was prepared and evaluated in the same manner as example 8, except that the solid catalyst component (A9) was used instead of the solid catalyst (A3). The polymerization results are shown in Table 1.

| | Example | | | | | | | | | |
|---|---|---|---|---|---|---|---|---|---|---|
| | Yield | | Block | | EPR | Ethylene content | | I.V.- | | Izod |
| | Bulk-Homo g/g-cat. | Gas-ICP g/g-cat. | ratio % | MFR g/10 min. | content wt% | in EPR wt% | in XI wt% | EPR dL/g | FM MPa | (−30 deg. C.) kJ/m$^2$ |
| 1 | 35,700 | 7,900 (60 min.) | 18.1 | 160 (Homo) 59 (ICP) | 16.0 | 42.9 | 3.1 | 2.9 | 1,250 | 4.6 |
| 2 | 32,800 | 7,200 (60 min.) | 18.0 | 180 (Homo) 65 (ICP) | 14.7 | 43.4 | 3.6 | 3.2 | 1,250 | 4.1 |
| 3 | 23,300 | 3,600 (60 min.) | 13.3 | 150 (Homo) 65 (ICP) | 12.6 | 42.0 | 2.1 | 3.1 | 1,380 | 3.8 |
| 4 | 21,500 | 3,100 (30 min.) | 12.6 | 130 (Homo) 67 (ICP) | 10.8 | 41.0 | 2.2 | 3.7 | 1,420 | 3.6 |
| 5 | 21,800 | 3,500 (45 min.) | 14.0 | 140 (Homo) 52 (ICP) | 10.9 | 41.9 | 3.2 | 4.6 | 1,390 | 4.4 |
| 6 | 21,100 | 3900 (45 min.) | 15.6 | 140 (Homo) 47 (ICP) | 11.9 | 42.6 | 3.0 | 4.6 | 1,360 | 4.7 |
| 7 | 21,700 | 3,500 (45 min.) | 13.9 | 150 (Homo) 55 (ICP) | 11.1 | 41.6 | 2.8 | 4.3 | 1,410 | 4.2 |
| 8 | 20,000 | 2,100 (30 min.) | 9.6 | 140 (Homo) 56 (ICP) | 8.8 | 40.5 | 2.2 | 6.1 | 1,458 | 3.8 |
| 9 | 31,000 | 5,800 (60 min.) | 15.7 | 170 (Homo) 71 (ICP) | 13.6 | 43.8 | 3.9 | 3.3 | 1,290 | 3.6 |
| 10 | 24,500 | 2,800 (30 min.) | 10.3 | 120 (Homo) 52 (ICP) | 7.8 | 42.5 | 2.1 | 5.9 | 1,510 | 3.6 |
| 11 | 8,500 | 1,000 (30 min.) | 10.3 | 130 (Homo) 63 (ICP) | 9.1 | 42.3 | 2.1 | 5.8 | 1,410 | 4.3 |
| 12 | 19,100 | 1,900 (30 min.) | 9.0 | 140 (Homo) 60 (ICP) | 7.5 | 40.4 | 2.1 | 6.4 | 1,500 | 3.6 |
| 13 | 15,500 | 800 (30 min.) | 4.7 | 42 (Homo) 23 (ICP) | 7.1 | 42.9 | 1.9 | 6.5 | 1,630 | 3.2 |

| | Comparative Example | | | | | | | | | |
|---|---|---|---|---|---|---|---|---|---|---|
| | Yield | | Block | | EPR | Ethylene content | | I.V.- | | Izod |
| | Bulk-Homo g/g-cat. | Gas-ICP g/g-cat. | ratio % | MFR g/10 min. | content wt% | in EPR wt% | in XI wt% | EPR dL/g | FM MPa | (−30 deg. C.) kJ/m$^2$ |
| 1 | 35,400 | 5,600 (40 min.) | 13.7 | 180 (Homo) 72 (ICP) | 11.8 | 43.4 | 2.5 | 3.1 | 1,420 | 3.6 |
| 2 | 39,300 | 6,400 (40 min.) | 14.0 | 190 (Homo) 73 (ICP) | 12.0 | 41.3 | 2.5 | 3.3 | 1,360 | 3.7 |
| 3 | 40,500 | 7,200 (60 min.) | 15.1 | 170 (Homo) 60 (ICP) | 12.0 | 40.1 | 3.1 | 3.8 | 1,310 | 4.4 |
| 4 | 34,200 | 3,300 (30 min.) | 8.7 | 170 (Homo) 81 (ICP) | 7.7 | 39.7 | 2.0 | 5.7 | 1,510 | 3.2 |

As is clear from the results shown in Table 1, the olefin polymerization catalysts respectively prepared using the solid catalyst components obtained in Examples 1 to 13 achieved high second-step copolymerization activity when implementing multistep copolymerization. A large amount of ethylene was introduced into the propylene-ethylene block copolymer, and excellent sustainability of olefin polymerization was achieved during copolymerization. Ethylene was efficiently introduced into the rubber part, and a good balance between rigidity and impact strength was achieved. On the other hand, as is clear from the results shown in Table 1, ICP produced with the solid catalyst component produced without using the vanadium compound showed a poor balance between rigidity and impact strength.

INDUSTRIAL APPLICABILITY

The embodiments of the invention thus provide a method for producing a propylene-based block copolymer that can achieve polymerization that ensures an excellent copolymer rubber production capability, and can produce a propylene-based block copolymer that exhibits rigidity and impact strength in a well-balanced manner.

What is claimed is:

1. A method for producing a solid catalyst component for olefin polymerization comprising bringing a vanadium compound into contact with a solid component that comprises magnesium, a halogen, titanium, and an internal electron donor compound.

2. The method for producing a solid catalyst component for olefin polymerization according to claim 1, wherein the vanadium compound is brought into contact with the solid component in a molar ratio of 0.01 to 10 with respect to titanium.

* * * * *